United States Patent Office.

JOHN JOSEPH CHARLES SMITH, OF COLLEGE POINT, NEW YORK.

RUBBER VENEER OR COVERING-SHEET.

SPECIFICATION forming part of Letters Patent No. 246,829, dated September 6, 1881.

Application filed May 12, 1880. (Specimens.)

*To all whom it may concern:*

Be it known that I, JOHN JOSEPH CHARLES SMITH, a citizen of the United States, residing at College Point, Queen's County, in the State of New York, have invented Improvements in Rubber Veneers or Covering-Sheets, of which the following is a specification.

The object of my invention is to produce a sheet of india-rubber or other analogous gum of such a nature and quality and with such a surface that it may be firmly glued or cemented on wood or other fibrous material in a cheap and efficient manner, whereby such gum in a vulcanized state may be usefully employed to cover fine wood-work, furniture, books, picture-frames, and other articles.

It has been a long-felt want and desire to have a hard, strong, and durable covering for wood, which covering would be of such a quality as to receive a fine polish without resorting to varnishes, lacquers, enamels, or the like, which are perishable and liable to injury by scratching and other causes. Veneers of fine wood—such as ebony, rose-wood, &c.—are not only expensive, but their application involves much labor, care, and skill, especially if the surface of the wood to which they are to be applied is curved or irregular—as, for example, in the case of moldings and the like—and after their application such veneers must be polished with much labor. Hard india-rubber, on account of its deep black color, solid body, toughness, capacity to receive a high polish, and imperviousness to water and other liquids, has long been regarded as an excellent material for covering wooden and other articles, but serious obstacles have hitherto prevented its general or extensive use for such a purpose. These difficulties are, first, the costliness of the material; second, and chiefly, the want of any practical mode by which it could be firmly glued or cemented to wood or other fibrous material. It is well known to those skilled in the treatment and manipulation of rubber that vulcanite is a substance most difficult to unite firmly to another body by means of glue or any of the many kinds of strong cement. Its close and greasy-like body repels and sets at defiance such cements as are used to unite glass, or even metals.

To overcome this great difficulty is the object of my invention, by the application of which I can glue or cement a thin or thick sheet of hard rubber to wood or other fibrous material as firmly and securely as two veneers or boards of wood can be glued together; and, furthermore, I can glue or cement a rubber sheet on wood worked into moldings or other irregular curves with a perfection which cannot be obtained by the most skillful cabinet-maker with wood veneers.

In order that my invention may be fully understood by any one skilled in the art, I will proceed to describe the mode of carrying it into effect, premising some necessary explanations.

It is an established fact that glue and other cements take the most firm hold on porous and fibrous materials. Therefore it has been my aim to produce such a surface on a rubber sheet in a practical and efficient manner. India-rubber and other vulcanizable gums, while in a raw or unvulcanized state, will cohere very strongly to fibrous materials, and this property I turn to advantage as a step to accomplish my desired result in the following manner:

I take a finely-polished sheet of brass or other metal or glass, or any other material which is suitable to vulcanize rubber on. On such a plate of glass or metal I lay a sheet of the raw-rubber compound, as it is used for hard rubber. The rubber sheet, if to be used for a thin covering or veneer, I make about one-sixty-fourth of an inch thick. The rubber sheet must be laid smoothly and carefully on the plate, so as to expel the air between the plate and surface of the rubber. When this is done I lay a sheet of linen or cotton cloth on the rubber. The cloth must be free from starch. This cloth I rub carefully on the rubber, so as to partly unite the same. The cloth should be about one-half an inch smaller than the rubber sheet all around. When the cloth is nicely laid on it is covered by a sheet of tin-foil. The tin-foil must be well united with the sheet of rubber on the edges projecting over the cloth. It is essential that the rubber and cloth be well protected, and that the rubber be well united with the metal plate and tin-foil covering, so as to prevent the intrusion between the rubber and the cloth of the steam or superheated water used as a pressure-medium during vulcanization, or the surface of the back-pressure plate, (hereinafter referred to,) coming in contact with the rubber, which, if it takes place, will prevent a perfect production of the desired result. When a plate of metal is so covered with rubber and the rubber with cloth, as described, the whole is brought more firmly together by means of some pressure, and is then ready to enter the vulcanizing-vessel. By this time the rubber has acquired a partial adhesion to the cloth; but by placing a heavy plate of metal on the back of the tin-foil cover during the process of vulcanizing, the rubber will be caused to partly penetrate the cloth and to remain firmly united with the same after vulcanizing. Some judgment must be exercised not to put too much pressure on the cloth, or else the rubber will completely penetrate the cloth and leave no porous or fibrous surface, which porous surface is the essential object of the process. The same bad effect will be produced if rubber solutions are employed, as cements, to stick the cloth to the rubber. The pressure used on the plate during the process of vulcanization should be about fifteen pounds to the square inch. For this purpose I prefer to employ the method of applying water as a pressure-medium during the process of vulcanizing described and claimed by Charles Grasser in his patent of June 6, 1876, No. 178,432, thereby avoiding the use of cumbersome weights. When the vulcanizing process is completed the plates are removed and parted, and the hardened sheet of rubber is taken out from between them. The sheet of rubber then presents two surfaces. The front surface, which was lying against the polished metal plate, is fine and polished, while the back will have a porous fibrous surface. Such a thin sheet of hard rubber is very tough and pliable, almost like leather, and on account of the porous or fibrous surface can be glued firmly to wood or other material without difficulty. The rubber has partly penetrated the fibers and threads of the cloth, and both are inseparable. At the same time the cloth presents enough pores and fibers to give a firm hold to the glue or cement. Instead of cloth I have also used thin wood veneers, but prefer the cloth on account of its pliability. It is further a comparatively-easy matter to produce very fine and delicate designs on such a rubber sheet by simply engraving or etching the desired designs on the metal plate, which will then copy on the sheet rubber with perfection. It is hardly necessary to say that a metal plate so ornamented will yield hundreds of copies on the rubber.

I will now describe how such a sheet of rubber may be used to cover wood moldings in their various shapes, especially so if the curves are sharp and a very sharp outline of the molding is desired. For this purpose I make a hard metal mold of the desired shape of the molding. Such a mold may be several feet long, and is finely finished and polished. For this mold I provide a metal counter or follower. The counter or follower is made as much smaller as the thickness of the sheet-rubber will require space. When so provided I lay the sheet of rubber on a hot steam-table, which will render the rubber still more pliable and ductile. The metal mold is also heated. This being done, the sheet-rubber is placed in the mold, the smooth rubber surface toward the mold. The counter or follower is placed in on the cloth-surface, and by means of a moderate pressure the sheet-rubber is bent into all the curves and sharp outlines. When removed from the mold it will retain the acquired shape perfectly. When the rubber sheet is thus formed a molding of wood corresponding in shape to the inside of this shell is easily glued on and will adhere firmly.

When even surfaces of wood or moldings and curves which do not present very sharp corners are to be covered with my "rubber-veneer," as I may call it, no previous shaping in a mold is required, but a simple wooden counter or sand-bag may be employed in the same manner as cabinet-makers apply wood veneers.

Moldings covered with my rubber veneer may be used and worked up for an endless variety of useful and handsome articles, such as clock-cases, jewel-caskets, picture-frames, and furniture. The veneer is also a fine and durable substance for book-covers, &c.

My rubber veneer can be made with a polished surface or otherwise, with designs or in imitation of morocco-leather, &c. It requires no varnish or lacquer, and does not scratch so easily as varnish or a polished surface of wood. Such rubber veneers may be made in different colors and shades by mixing vermilion with the compound, which, according to the mixture, will produce red, red-brown in different shades, and also imitations of rose-wood and some colored marbles.

I am aware that it has been proposed to attach fibrous sheets to hard rubber by means of a film of soft rubber; but this would be quite impracticable for the purposes of my invention.

I am also aware that it has been proposed to unite a protecting coat of paper with rubber in the process of vulcanization; but this is not intended for veneer, and is inapplicable to the purposes of my invention, for the reason that paper attached to rubber by one surface and glued or otherwise cemented to a solid body by its other surface, will split and separate, and does not constitute a secure bond between the cement and the rubber, or a means of giving the cement an effective hold on the body of the rubber.

It is an essential and important characteristic of my invention that the homogeneous hard-rubber compound which is completely vulcanized by heat is embedded in one surface of the fibrous sheet, partially penetrating the same, while leaving one surface unimpaired in its fibrous character, so as to be perfectly adapted to receive the glue or other cement, which latter, by penetrating the fibrous material itself, becomes embedded in the body of the rubber where the latter is made porous by having been pressed into the body of the fibrous material while in its plastic state.

Having described the nature of my invention, and the mode in which I have carried it into effect with complete success, what I claim as new therein, and desire to secure by Letters Patent, is—

1. A sheet of vulcanized india-rubber or other allied gum having two surfaces, one a hard surface, smooth and polished, or suitably ornamented, the other a porous or fibrous surface produced by the application of a sheet of fibrous material in which the hard rubber is partially embedded and with which it is permanently combined by vulcanization, as explained.

2. The process herein described of producing rubber veneers or covering-sheets, the same consisting in applying a sheet of cloth, wood, or other suitable fibrous material to the hard-rubber compound while in its soft or raw state, with moderate pressure, to partially embed the rubber in the fibrous sheet, and subjecting the same to vulcanizing-heat while under pressure, so as to permanently combine the gum and fibrous material in one sheet, as explained.

3. The mode of producing moldings or veneers for irregular surfaces, substantially as herein described, by combining with one face of the rubber a sheet of fibrous matter, in which it is partially embedded and with which it is permanently united in the process of vulcanization, and imparting the required irregular shape to the compound sheet while in a warm state by means of a mold and follower, as explained.

JOHN JOSEPH CHAS. SMITH.

Witnesses:
JOHN P. STEPP,
JULIUS FEVIRLEIN.